United States Patent
Abe et al.

(10) Patent No.: US 9,071,113 B2
(45) Date of Patent: Jun. 30, 2015

(54) DRIVE UNIT TERMINAL HOLDER

(75) Inventors: Tatsuya Abe, Chiryu (JP); Hiroshi Imai, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 351 days.

(21) Appl. No.: 13/469,198

(22) Filed: May 11, 2012

(65) Prior Publication Data
US 2012/0286604 A1    Nov. 15, 2012

(30) Foreign Application Priority Data

May 11, 2011   (JP) .................................. 2011-106362

(51) Int. Cl.
H02K 5/22    (2006.01)
H02K 11/00    (2006.01)

(52) U.S. Cl.
CPC ............ *H02K 11/0073* (2013.01); *H02K 5/225* (2013.01)

(58) Field of Classification Search
CPC ..... H02K 5/22; H02K 5/225; H02K 11/0068; H02K 11/0073
USPC .................................................. 310/71, 416
See application file for complete search history.

(56) References Cited

U.S. PATENT DOCUMENTS

| | | | |
|---|---|---|---|
| 5,038,088 A * | 8/1991 | Arends et al. ................. | 318/565 |
| 5,810,111 A | 9/1998 | Takeuchi et al. | |
| 5,912,541 A * | 6/1999 | Bigler et al. .................. | 318/600 |
| 6,619,933 B2 * | 9/2003 | Ikeda .......................... | 417/410.1 |
| 2002/0025265 A1 * | 2/2002 | Ikeda .......................... | 417/410.1 |
| 2002/0060105 A1 | 5/2002 | Tominaga et al. | |
| 2009/0155101 A1 * | 6/2009 | Fukasaku et al. .......... | 417/410.1 |
| 2009/0267430 A1 | 10/2009 | Imamura et al. | |
| 2009/0285703 A1 * | 11/2009 | Osaka et al. ............... | 417/410.1 |

FOREIGN PATENT DOCUMENTS

| | | | | |
|---|---|---|---|---|
| JP | 63-088057 | | 6/1988 | |
| JP | 04-033534 | | 2/1992 | |
| JP | 10248199 A | * | 9/1998 | ............... H02K 5/22 |
| JP | 2000-217310 | | 8/2000 | |
| JP | 2000217310 A | * | 8/2000 | ............. H02K 11/00 |
| JP | 2004-032930 | | 1/2004 | |

OTHER PUBLICATIONS

Mochizuki et al., JP10248199 Machine Translation, Sep. 1998.*

(Continued)

*Primary Examiner* — Quyen Leung
*Assistant Examiner* — Eric Johnson
(74) *Attorney, Agent, or Firm* — Nixon & Vanderhye P.C.

(57) ABSTRACT

A motor includes a stator having a winding wire wound thereon, a rotor, and a shaft. The motor is housed in a motor case, where the motor case has a cylinder part and a bottom part. A first terminal is disposed on the motor case, and has one end coupled to an end of the winding wire, such that the wire passes through a first opening on the bottom part. A controller case is disposed detachably on the bottom part. The controller case has a controller housed therein, and has a second terminal that has one end electrically coupled to a power module and the other end engages with the first terminal to electrically couple the motor and the controller. A terminal holder is attached on the motor case to hold and support the first terminal.

7 Claims, 11 Drawing Sheets

(56) References Cited

OTHER PUBLICATIONS

Sakata et al., JP2000217310 Machine Translation, Aug. 2000.*
U.S. Appl. No. 13/469,126 of Tomizawa et al, filed May 11, 2012.
U.S. Appl. No. 13/469,134 of Suga et al, filed May 11, 2012.
U.S. Appl. No. 13/469,207 of Miyachi et al, filed May 11, 2012.

Office Action (7 pages) dated Jan. 24, 2014, issued in corresponding Chinese Application No. 201210144839.3 and English translation (8 pages).
Office Action (1 page) dated Apr. 22, 2014, issued in corresponding Japanese Application No. 2011-106362 and English translation (2 pages).

* cited by examiner

DRIVE UNIT TERMINAL HOLDER

CROSS REFERENCE TO RELATED APPLICATION

This application is based on and claims the benefit of priority of Japanese Patent Applications No. 2011-106362 filed on May 11, 2011, the disclosure of which is incorporated herein by reference.

TECHNICAL FIELD

The present disclosure generally relates to a drive unit which has, in one body, a motor and a controller to control a rotation of the motor.

BACKGROUND

Conventionally, an electric power steering apparatus that uses, as the drive unit, a motor and a controller formed in one body is known. The drive unit disclosed in Japanese patent document No. 3,538,944 (JP '944) has the motor and its control unit in one body, and a motor side terminal and a controller side terminal are connected by welding by way of a conductive member (i.e., a pigtail). In such configuration of the drive unit, combination and separation of the motor and its controller may be difficult. Therefore, it may be difficult to replace the controller when, for example, the controller is broken. As a result, in order to repair the electric power steering apparatus, the drive unit may have to be replaced as a whole.

SUMMARY

In an aspect of the present disclosure, a drive unit includes a motor case, a motor, a controller case, a controller, and a terminal holder. The motor case has a cylinder part and a bottom part, which has a first opening and is used to close one axial end of the cylinder part.

The motor has a stator with a winding wire wound thereon, a rotor disposed inside of the stator, a shaft disposed inside of and coupled to the rotor serving as a rotation axis of the rotor, such that the rotor and the shaft rotate relative to the stator as one. The motor also includes a first terminal with one end electrically coupled to one end of the winding wire that passes through the first opening of the motor case.

The controller case is formed in the shape of a cylinder, and is attached on an opposite side of the motor case relative to its bottom part, with its axis substantially in parallel with the axis of the motor case. The controller is housed inside of the controller case, and includes a switching element for switching supply of electricity for the winding wire of the motor. The controller also includes a control unit for turning the switching element on and off to control a rotation of the motor, and a second terminal that is electrically coupled to the switching element and the first terminal.

The terminal holder is attached on either the motor case or the controller case, and holds either the first terminal or the second terminal, so that the other end of the first terminal is engagable with the other end of the second terminal.

In the above-described manner, the motor case and the controller case are attachable and detachable. Further, the engagement between the first terminal on the motor side and the second terminal on the controller side provides the necessary electrical coupling between the motor and the controller. Therefore, the first terminal and the second terminal are easily separable and attachable when a predetermined force for separation or insertion (i.e., combination) is applied thereon. Thus, the controller case can easily be detached and (re)attached from or to the motor case. As a result, a broken controller can easily be replaced without replacing the motor, or vice versa.

Further, when the drive unit is used for an electric power steering apparatus of a vehicle, a broken drive unit can be repaired with the motor (i.e., the motor case) kept attached on the vehicle, by replacing the controller only. Therefore, the vehicle can be repaired without being taken to the factory. That is, a service station, a vehicle dealer or the like can fix such problem, thereby saving time for the user to bring the vehicle to the factory and to wait for the repair work.

Further, in the present disclosure, the electric connection between the first terminal on the motor side and the second terminal on the controller side can be realized only by the engagement of those terminals with each other. Therefore, the motor and the controller may be assembled separately, and may be assembled, for example, in a final step onto the vehicle. In such manner, efficiency of the production work of the drive unit is improved.

In addition to the above configuration, the terminal holder is coupled to the first opening of the motor case, and holds the first terminal such that the other end of the first terminal is engagable with the second terminal. In other words, the present disclosure provides a configuration of affixing the terminal holder to the motor case.

In addition to the above configuration, the terminal holder closes the first opening of the motor case. In such manner, foreign matter is prevented from falling into the motor case through the first opening, through which an end of the winding wire of the motor is drawn outside of the motor case and into the terminal holder.

In addition to the above configuration, the terminal holder has a first fitting portion that couples to an inner edge of the first opening of the motor case. In such manner, the terminal holder is prevented from falling off in the axial direction of the motor case.

In addition to the above configuration, the terminal holder has an extension portion that extends in an opposite direction relative to the first fitting portion. Further, a latch member that holds the extension portion of the terminal holder onto the bottom part of the motor case. In the present disclosure, the first fitting portion of the terminal holder is engaged with the inner edge of the first opening, and the extension portion on the other side of the terminal holder is held by the latch member. Therefore, the terminal holder is more effectively prevented from falling off in the axial direction of the motor case.

In addition to the above configuration, the bottom part of the motor case has a second opening that is different from the first opening. Further, the terminal holder has a second fitting portion that couples to the inner edge of the second opening. In the present disclosure, the first fitting portion affixes to the inner edge of the first opening, and the second fitting portion affixes to the inner edge of the second opening. Therefore, the terminal holder is prevented from falling off from the motor case in the axial direction.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described in the following based on the drawings. In the embodiments, like number indicate like parts, and the description of the same parts are omitted from the later embodiments.

First Embodiment

Figure 1:
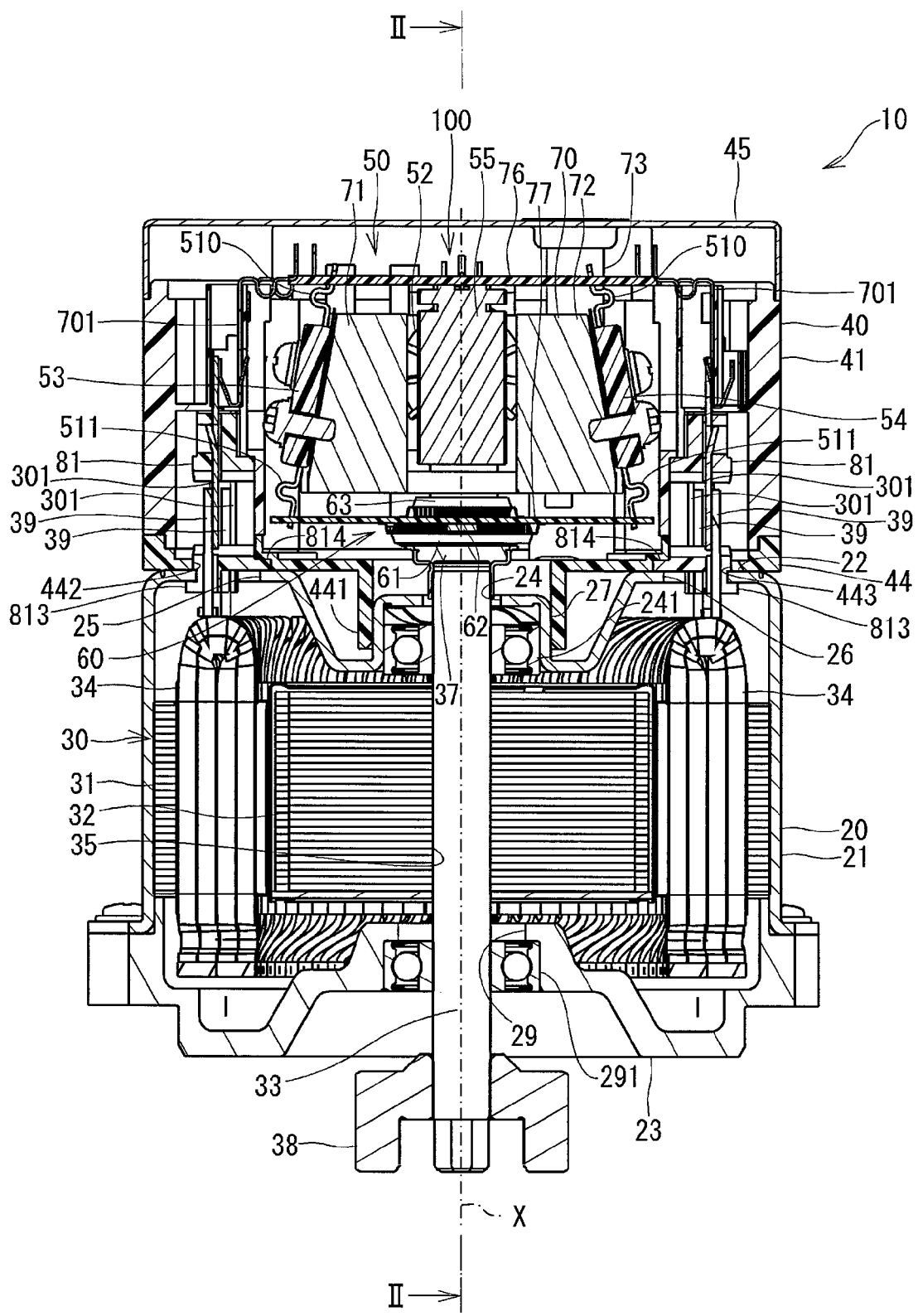
FIG. 1 is a cross-sectional view of a drive unit in a first embodiment of the present disclosure.
Figure 2:
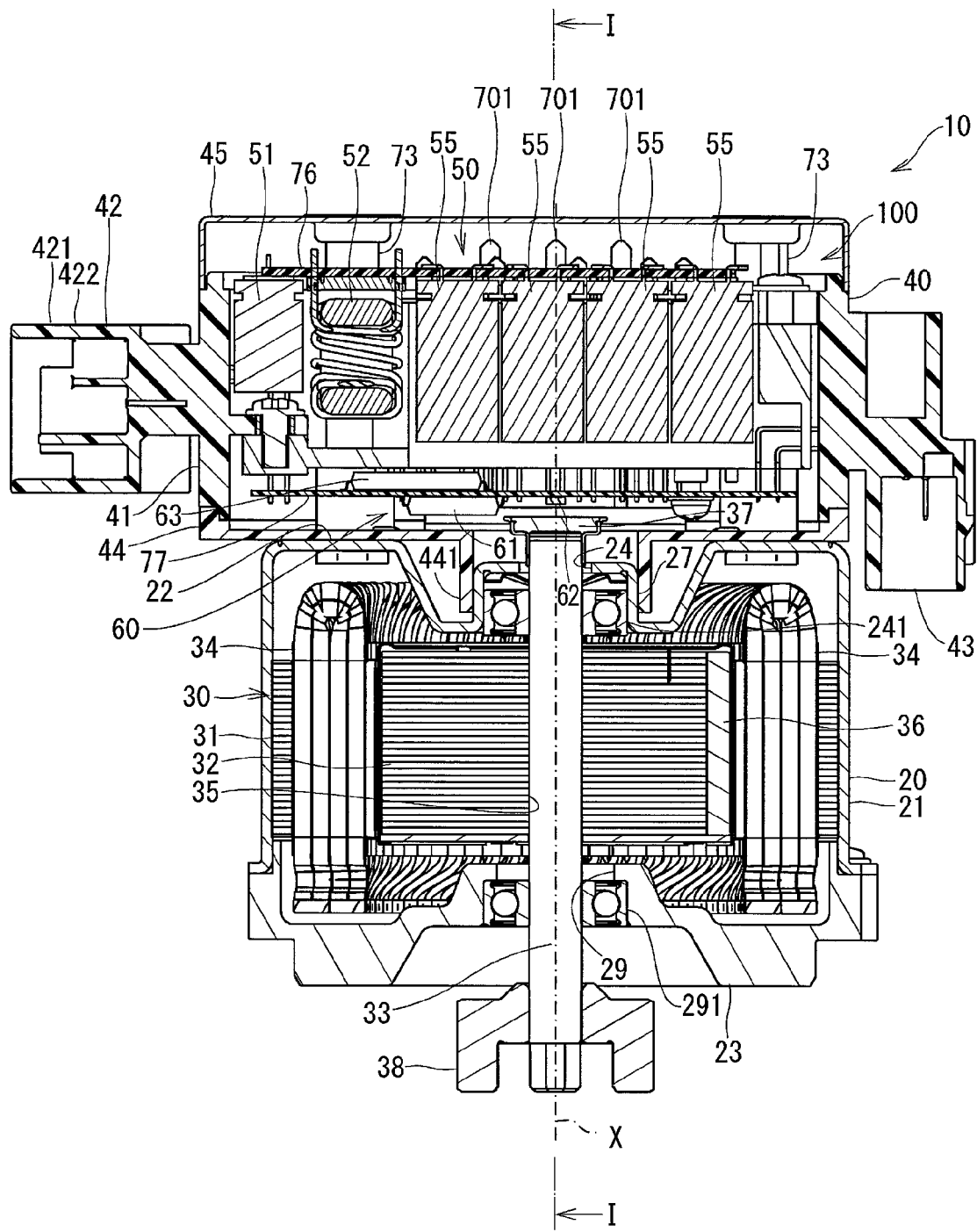
FIG. 2 is a cross-sectional view along line II-II of FIG. 1.
Figure 3:
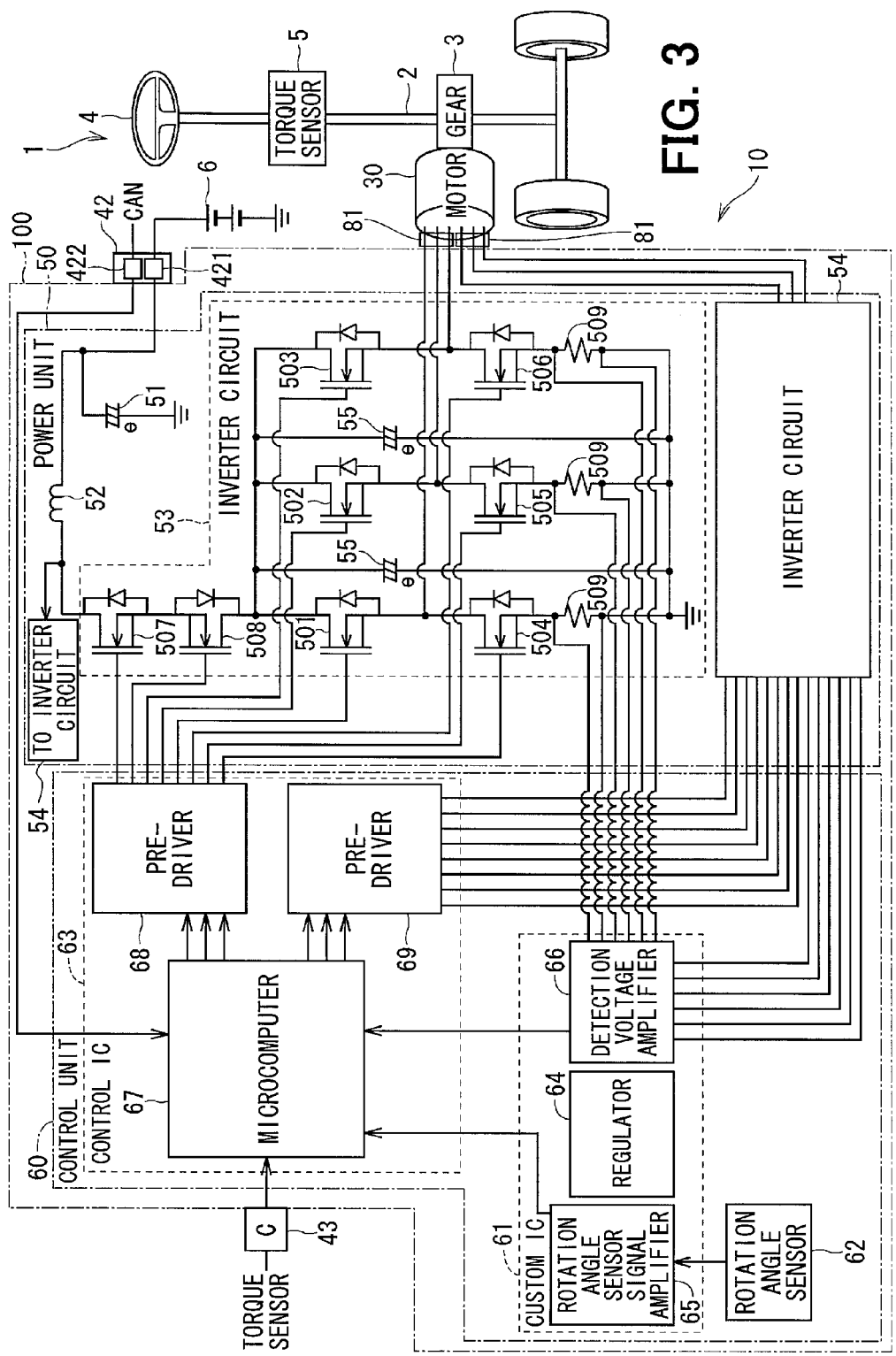
FIG. 3 is an illustration of a circuit and application of the drive unit of the present disclosure.

With reference to FIGS. 1 to 5, a drive unit 10 is provided for an electric power steering apparatus 1 in a vehicle (FIG. 3). The drive unit 10 is engaged with a gear 3 of a gearbox that is disposed on a column 2. The drive unit 10 generates an assist force for a steering operation by rotating a motor 30 based on various signals, such as a vehicle speed signal received through a controller area network (CAN), a torque signal from a torque sensor 5 that detects a steering torque of a steering wheel 4, and the like.

As shown in FIGS. 1 and 2, where FIG. 1 is provided as a cross-section of the drive unit 10 along line I-I of FIG. 2, the drive unit 10 includes a motor case 20, the motor 30, a controller case 40, a controller 100 and a terminal holder 81, together with other parts.

The motor case 20 has a cylinder part 21 and a bottom part 22, and may be formed of metal. The cylinder part 21 is formed substantially in a cylinder shape. The bottom part 22 is formed at one end of the cylinder part 21 to close an opening of the cylinder part 21. The bottom part 22 defines a shaft hole 24 around a center axis X of the drive unit 10 (i.e. the shaft hole 24 is defined through the bottom part 22 in a thickness direction of the bottom part 22). Further, the bottom part 22 defines two first openings (i.e., a first opening 25 and a first opening 26) formed in the same manner through the bottom part 22 on either side of the shaft hole 24, such that the shaft hole 24 is substantially in the middle of the first opening 25 and the first opening 26.

The cylinder part 21 also includes a frame end 23 that is disposed on the opposite end of the cylinder part 21 relative to the bottom part 22. The frame end 23 is arranged to close an opening of the cylinder part 21. Similar to the bottom part 22, the frame end 23 defines a shaft hole 29 around the center axis X (i.e., the shaft hole 29 is defined in a board thickness direction of the frame end 23), such that the center of the shaft hole 29 is aligned with the center of the shaft hole 24.

The motor 30 has a stator 31, a rotor 32, a shaft 33 and a first terminal 301, together with other parts. The stator 31 is formed substantially in the shape of a circular ring by stacking sheets of magnetic material. The stator 31 is housed inside of the cylinder part 21 of the motor case 20, with its outer wall fixed onto an inner wall of the cylinder part 21. The stator 31 and the cylinder part 21 are disposed coaxially. The stator 31 has a plurality of winding wires 34 wound thereon. Each end 39 of the plurality of winding wires 34 passes through the first opening 25 or the first opening 26 to the other side of the bottom part 22 of the motor case 20, relative to the cylinder part 21. In the present embodiment, each of the first opening 25 and the first opening 26 has three ends 39 going therethrough. Further, the three ends 39 in each of the openings 25, 26 respectively correspond to three phases (i.e., a U phase, a V phase, a W phase) of the winding wires 34.

The rotor 32 is formed substantially in the shape of a circular column by stacking sheets of magnetic material. The rotor 32 is disposed inside of and coaxially with the stator 31, such that the rotor 32 rotates relative to the stator 31. The rotor 32 has an axis hole 35 formed at a position of its rotation axis. On an outer wall of the rotor 32, a plurality of magnets 36 are disposed equidistantly with an interval in a circumferential direction, in an alternate manner alternating an N pole and an S pole.

The shaft 33 is formed substantially in the shape of a rod and may be made of metal. The shaft 33 is disposed in the axis hole 35 and is fixed to the rotor 32. The shaft 33 is supported by a bearing 241 disposed on the bottom part 22 side of the motor case 20 and by a bearing 291 disposed on the frame end 23 side of the motor case 20. The bearing 241 is disposed in a pipe part 27, which is formed by the bottom part 22 around the shaft hole 24, such that the bearing 241 is positioned within the motor case 20 and is centered along the same axis as the shaft hole 24. The bearing 291 is disposed in the shaft hole 29 on the frame end 23, such that the bearing 291 is positioned on an outer surface of the frame end 23 and is centered along the same axis as the shaft hole 29. Therefore, the shaft 33 together with the rotor 32 rotates relative to the stator 31 as one, where the rotational axis of the shaft 33 and the rotor 32 is about the center axis X A magnet 37 is disposed is disposed on one end of the shaft 33. An output end 38 is formed on the other end of the shaft 33. The output end 38 engages with the gear 3 of the electric power steering apparatus 1.

Figure 4:
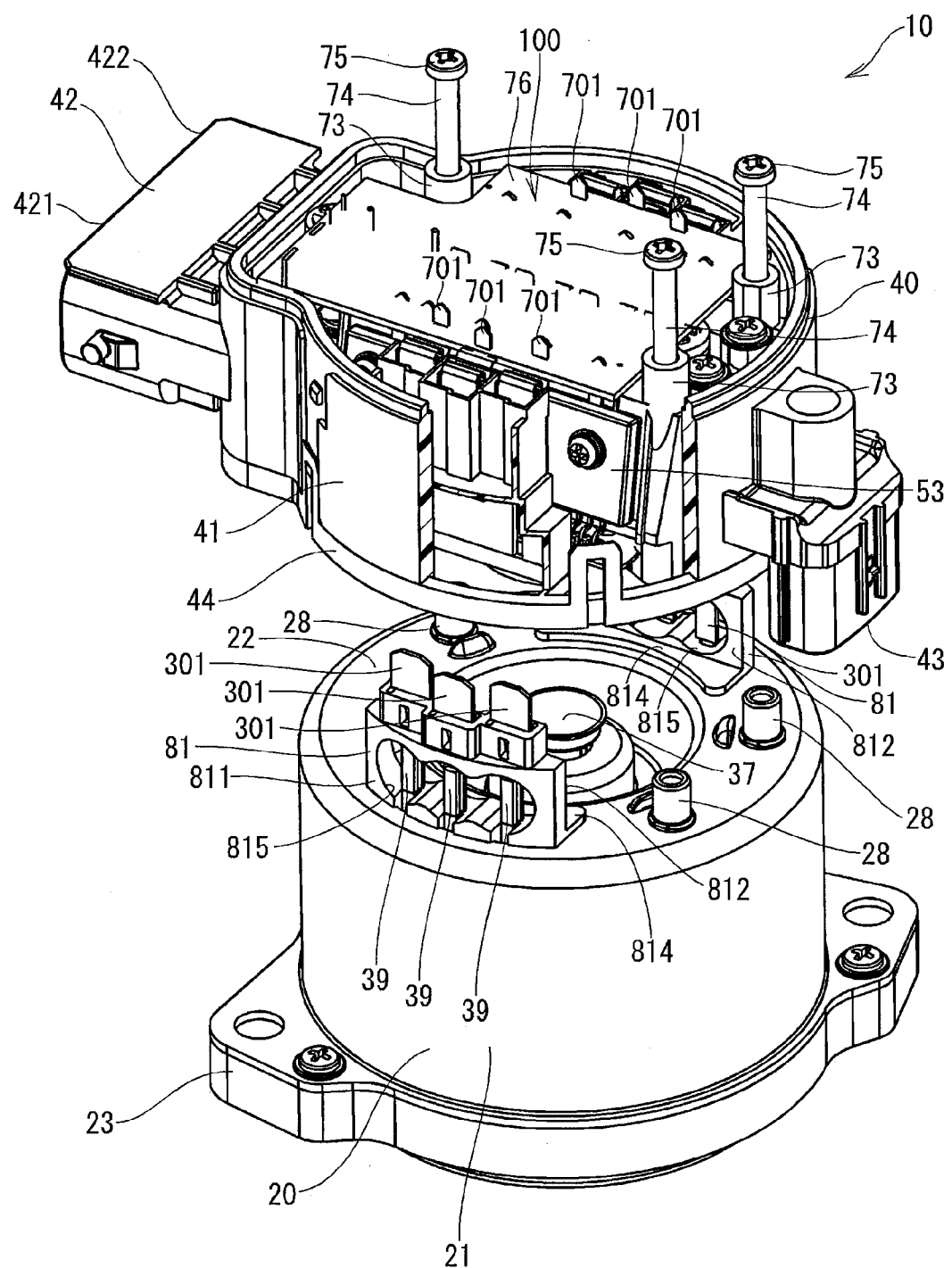
FIG. 4 is an exploded perspective view of the drive unit in the first embodiment of the present disclosure.

The first terminal 301 may be, for example, formed substantially in the shape of a long board, and may be made of metal, such as copper (FIG. 4). The first terminal 301 is disposed, such that one end is electrically coupled to each end 39 of the winding wires 34 by way of the first opening 25 and the first opening 26 of the bottom part 22. In other words, six first terminals 301 are provided, which are divided into two groups, that is, three ends 39 on the first opening 25 side and three ends 39 on the first opening 26 side. Further, each end 39 of the winding wires 34 and the first terminal 301 are electrically coupled by, for example, welding. Further, the other end of the first terminal 301 is formed in a male shape.

With reference to FIGS. 1, 2, and 4, the controller case 40 has a main body 41, a first connector 42, a second connector 43, a lid 44 and a cover 45. The main body 41 is formed substantially in the shape of a cylinder and may be made of resin. The first connector 42 and the second connector 43 are arranged to protrude from the main body 41 in a radially-outward direction. The first connector 42 has a power connector 421 for power supply and a signal connector 422 to receive signals. The lid 44 may be made of resin, and is disposed to close one end of the main body 41 (i.e. an end of the main body 41 closest to the motor case 20). The cover 45 may be made of metal, and is disposed to close the other end of the main body 41 (i.e. an end of the main body 41 farthest from the motor case 20).

The controller case 40 is disposed in the following manner, in which the main body 41 and the cylinder part 21 of the motor case 20 are coaxially disposed, and the lid 44 abuts to a surface of the bottom part 22 of the motor case 20. In other words, the controller case 40 (i.e., the main body 41) and the motor case 20 (i.e., the cylinder part 21) are arranged to have their axes aligned substantially in parallel with each other (i.e., the axis of the controller case 40 and the motor case 20 are aligned about the center axis X). At the center of the lid 44 of the controller case 40, a pipe part 441 is formed. An inner wall of the pipe part 441 abuts to an outer wall of the pipe part 27 of the bottom part 22 of the motor case 20. Further, the lid 44 has, at positions corresponding to the first opening 25 and the first opening 26 of the bottom part 22 of the motor case 20, an opening 442 and an opening 443 formed thereon, respectively. Each of the openings 442, 443 has the three ends 39 of the winding wires 34 going therethrough.

The controller 100 has a power unit 50 and a control unit 60. The circuit configuration of the controller 100 is shown in FIG. 3. The power unit 50 has a first capacitor 51, a choke coil 52, a power module 53 as an inverter circuit, a power module 54 as an inverter circuit, and a second capacitor 55, together with other parts.

The power unit 50 receives electricity from a power source 6 via the power connector 421 of the first connector 42. The first capacitor 51 and the choke coil 52 form a filter circuit, and reduce noise to the drive unit 10 from other devices that share the power source 6 with the drive unit 10, and also reduce noise from the drive unit 10 to the other devices that share the power source 6 with the drive unit 10. Further, the choke coil 52 is connected in series (i) between the power source 6 and the power module 53 and (ii) between the power source 6 and the power module 54, for attenuating a fluctuation of power supply.

The power module 53 is a semiconductor module that is covered by a sealing material, such as resin, and may be referred to as a sealing body. The power module 53 further includes switching elements 501 to 506, power source relays 507, 508, and shunt resistors 509, together with other parts.

In the present embodiment, the switching elements 501 to 506 may be provided as a field effect transistor, such as a metal-oxide-semiconductor field-effect transistor (MOSFET). The switching elements 501 to 506 are controlled by a gate voltage, for turning on/off a source-drain conductivity.

The drains of each of the switching elements 501 to 503 are coupled to the power source 6. The source of the switching elements 501 to 503 are coupled to the drains of the switching elements 504 to 506, respectively. The sources of the switching elements 504 to 506 are coupled to a ground. The connection points between the switching elements 501 to 503 and the switching elements 504 to 506 are electrically coupled to the motor 30.

The power source relays 507, 508 are MOSFET just like the switching elements 501 to 506. The power source relays 507, 508 are disposed between the switching elements 501 to 506 and the choke coil 52 to prevent an electric current from flowing toward the motor 30 side through the switching elements 501 to 506 during an abnormality.

The shunt resistors 509 are electrically coupled to a point between the switching elements 504 to 506 and a ground. The electric current flowing to the motor 30 can be detected by detecting the electric voltage or the electric current applied to the shunt resistor 509.

The power module 54 has the same configuration as the above-mentioned power module 53. The description of the power module 54 is thus omitted.

The second capacitor 55 is coupled to wiring and the ground, such that the second capacitor 55 is coupled in parallel with the switching elements 501 to 506. The second capacitor 55 supplements power supply for the switching elements 501 to 506 by storing an electric charge, and absorbs a ripple electric current occurring by switching of the electric current.

The control unit 60 has a custom IC 61, a rotation angle sensor 62 and a control IC 63, together with other parts.

The custom IC 61 is an integrated semiconductor circuit including a regulator 64, a rotation angle sensor signal amplifier 65, and a detection voltage amplifier 66, together with other parts.

The regulator 64 is a stabilization circuit stabilizing electricity from the power source 6. The regulator 64 stabilizes electricity supplied for each part. For example, a microcomputer 67 to be described later is operated on a stable predetermined voltage of, for example, 5V from the regulator 64.

The rotation angle sensor 62 transmits a signal to the rotation angle sensor signal amplifier 65. The rotation angle sensor 62 is disposed close to an end of the shaft 33 of the motor 30 near the magnet 37 (FIGS. 1 and 2). The rotation angle sensor 62 transmits to the rotation angle sensor signal amplifier 65, the sensed magnetic field as a signal regarding a rotation angle of the motor 30. The rotation angle sensor signal amplifier 65 amplifies the signal regarding the rotation angle of the motor 30 transmitted from the rotation angle sensor 62, and transmits the amplified signal to the microcomputer 67.

The detection voltage amplifier 66 detects a voltage between both ends of the shunt resistors 509, and amplifies and transmits the detected voltage to the microcomputer 67.

The control IC 63 is an integrated semiconductor circuit including the microcomputer 67, a pre-driver 68, a pre-driver 69, and the like. The microcomputer 67 is a small scale computer including a CPU as an operation unit, a ROM and a RAM as a memory unit, together with other parts. In the microcomputer 67, various kinds of processes are performed by a CPU according to various programs stored in the ROM.

The microcomputer 67 receives various kinds of information, such as the rotation angle of the motor 30 from the rotation angle sensor signal amplifier 65, the voltage of the shunt resistors 509 from the detection voltage amplifier 66, the steering torque signal from the torque sensor 5 via the second connector 43, vehicle speed information from CAN via the signal connector 422 of the first connector 42, and the like. When the signals are provided, the microcomputer 67 controls the power module 53 through the pre-driver 68 based on the rotation angle of the motor 30. More practically, the microcomputer 67 changes the gate voltage of the switching elements 501 to 506 through the pre-driver 68, for turning on/off of the switching elements 501 to 506, to ultimately control the power module 53.

Based on the voltage of the shunt resistors 509, which is provided by the detection voltage amplifier 66, the microcomputer 67 controls the power module 53 to supply an electric current having a shape that is close to a sine wave to the motor 30. Further, the microcomputer 67 controls the power module 54 through the pre-driver 69 in the same manner as controlling the power module 53 through the pre-driver 68.

The microcomputer 67 generates a pulse signal created through the pre-driver 68 and the pre-driver 69 by pulse width modulation (PWM) control, for the purpose of assisting a steering operation of the steering wheel 4, based on vehicle speed information and the like from various sensors, such as the rotation angle sensor 62, the torque sensor 5, the shunt resistor 509, and CAN. The pulse signal is provided to two systems of inverter circuits that are formed by the power module 53 and the power module 54, and controls ON-OFF switching of the switching elements 501 to 506 in the power modules 53, 54. In such manner, each phase of the winding wires 34 of the motor 30 has a sine wave current of respectively different phases, thereby creating a rotating magnetic field. Accordingly, the rotating magnetic field rotates the rotor 32 and the shaft 33, as one body. Thus, as the shaft 33 is rotated, a driving force is provided from the output end 38 of the shaft 33 to the gear 3 on the column 2, for assisting a steering of the steering wheel 4 by the vehicle driver.

With continuing reference to FIGS. 1 and 2, the physical arrangement of each part of the controller 100 is described in the following. The controller 100 is housed inside of the controller case 40 (i.e., the main body 41). In other words, the controller 100 is housed in an accommodation space that is defined by the main body 41 of the controller case 40, the lid 44, and the cover 45. The controller 100 has a heat sink 70, a power board 76, a control board 77, a second terminal 701, and the like, in addition to the above-mentioned power unit 50 and the control unit 60.

The heat sink 70 may be formed, for example, by metal such as aluminum. The heat sink 70 has a first heat dissipation unit 71, a second heat dissipation unit 72, and a pillar 73. The first heat dissipation unit 71 and the second heat dissipation unit 72 are formed in a block shape, and are disposed with a predetermined distance interposed therebetween to face each other. The pillar 73 is formed substantially in a cylinder shape, and is disposed on an end of the first heat dissipation unit 71 and on both ends of the second heat dissipation unit 72, that is, three pillars 73 are disposed in total.

Inside of the pillar 73 of the heat sink 70, bolts 74 are inserted (FIG. 4). The bolt 74 has a screw on the other side of a head 75, and the screw of the bolt 74 is screwed into a column 28 that is disposed on the bottom part 22 of the motor case 20. In such manner, the heat sink 70, in a housed condition in the controller case 40, is attached to the bottom part 22 of the motor case 20 together with the controller case 40.

The power board 76 is a board that may be, for example, a glass epoxy board, and is disposed between the cover 45 and the first and second heat dissipation unit 71, 72. The first capacitor 51, the choke coil 52, and the second capacitor 55 are provided on the power board 76, specifically on the surface of the power board 76 that faces the first and second heat dissipation unit 71, 72 and the motor 30. The first capacitor 51, the choke coil 52, and the second capacitor 55 are arranged side by side in a space formed between the first heat dissipation unit 71 and the second heat dissipation unit 72.

The control board 77 is a board that may be, for example, a glass epoxy board, and is disposed between the lid 44 and the first and second heat dissipation unit 71, 72. The custom IC 61 and the rotation angle sensor 62 are provided on a surface of the control board 77, specifically, the surface facing the motor 30. The rotation angle sensor 62 is disposed on an axis of the shaft 33. Further, the control IC 63 is provided on an opposite surface of the control board 77, specifically, the surface of the control board 77 that faces the cover 45.

The power module 53 is attached to a surface of the first heat dissipation unit 71, in an abutment manner, by way of a fastener, such as a screw. The power module 53 is attached to the surface of the first heat dissipation 71 that does not face the second capacitor 55 (i.e, the surface of the first heat dissipation unit 71 that is opposite to a surface that has the second capacitor 55). Further, the power module 54 is attached to a surface of the second heat dissipation unit 72, in an abutment manner, by way of a fastener, such as a screw. The power module 54 is attached to the surface of the second heat dissipation 72 that does not face the second capacitor 55 (i.e., the surface of the second heat dissipation 72 that is opposite to the surface that has the second capacitor 55) (FIG. 1).

The power module 53 has three power side terminals 510, which are coupled to respective connection points between the switching elements 501 to 503 and the switching elements 504 to 506, and protrude from the sealing body of the power module 53. The terminals on the opposite side of the sealing body, which is opposite to the power terminals 510, are soldered on the printed wires on the power board 76. Further, the power module 53 has control side terminals 511, which are coupled to the respective gates of the switching elements 501 to 506, and protrude from the sealing body. The terminals on the opposite side, which is opposite to the control side terminals 511, are soldered on the printed wires formed on the control board 77. In such manner, the power module 53 and the control IC 63 (i.e., the microcomputer 67) are electrically coupled through the printed wire.

The power module 54 has, just like the power module 53, the power side terminals 510, which are soldered on the printed wire on the power board 76, and also has the control side terminals 511, which are soldered on the printed wire on the control board 77 and are electrically coupled to the control IC 63.

The second terminal 701 is formed, for example, by metal such as copper, and is held by the main body 41 of the controller case 40. In the present embodiment, six second terminals 701 are arranged in total, corresponding to the three power side terminals 510 of the power module 53 and the three power side terminals 510 of the power module 54.

One end of each of the second terminals 701 is soldered on the printed wire on the power board 76, and is electrically coupled to the power side terminals 510 of the power modules 53, 54. In other words, one end of the second terminal 701 is electrically coupled to each of the switching elements 501 to 506.

The other end of each of the second terminals 701 is formed in a female shape. The other end of each the second terminals 701 is fitted to the other end (i.e., in a male shape) of each of the first terminals 301 of the motor 30. In other words, the other end of each of the second terminals 701 and the other end of each of the first terminals 301 are engaged with each other to enable an electrical connection.

The terminal holder 81 may be, for example, made of resin. As described above, the terminal holder 81 is disposed at two positions in the present embodiment, specifically, the terminal holders 81 is attached to the first opening 25 and to the first opening 26, which are formed on the bottom part 22 of the motor case 20. Further, two terminal holders 81 are respectively positioned to close the first opening 25 and the first opening 26. Each of the terminal holders 81 holds the first terminal 301 that is coupled to the end 39 of the winding wire 34 that passes through the first opening 25 or the first opening 26.

With reference to FIG. 4, in the present embodiment, the terminal holder 81 is formed substantially in a rectangular shape, with an outer-face 811 of the terminal holder 81 protruding as a curved surface and an inner-face 812 being formed as a plane surface. Two terminal holders 81 are disposed respectively on the first opening 25 and the first opening 26, with the outer-face 811 facing a radial outside of the motor case 20 and the inner-face 812 facing a radial inside of the motor case 20. In other words, the outer-face 811 of the terminal holder 81 faces away from the shaft 33 and the inner-face 812 of the terminal holder 81 faces the shaft 33.

Figure 5:
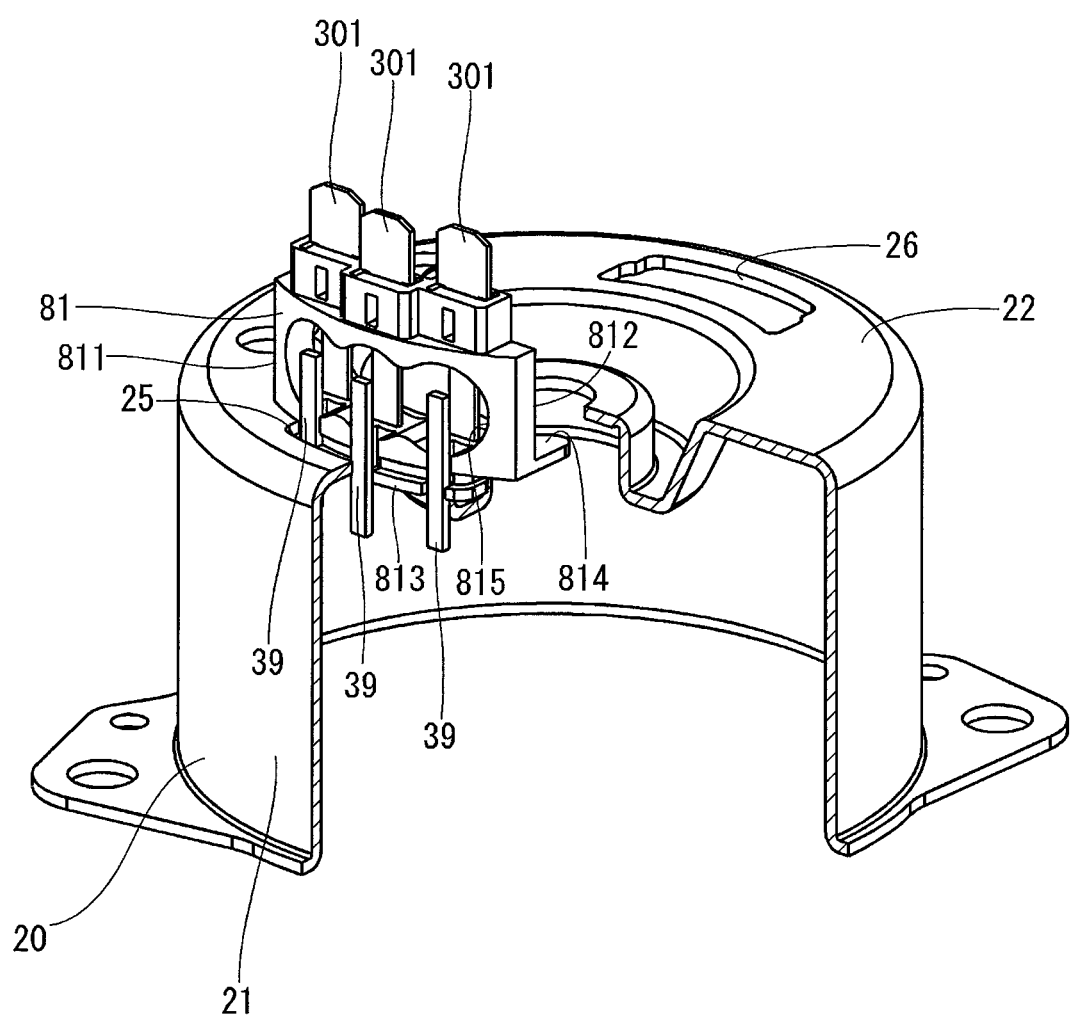
FIG. 5 is a perspective view of a part of a motor case and a terminal holder of the drive unit in the first embodiment of the present disclosure.

Further, as shown in FIG. 5, each of the terminal holders 81 has a first fitting portion 813 on the motor case 20 side end of the inner-face 811. The first fitting portion 813 couples to the inner-edge of the first opening 25 to engage the first fitting portion 813 with the inner-edge of the first opening 25. Specifically, by inserting the first fitting portion 813 into the first opening 25 and then sliding the terminal holder 81 in a direction towards the outer circumference of the bottom part 22 (i.e., sliding the terminal holder 81 away from the center of the motor case 20 and towards the outer periphery of the motor case 20)), the first fitting portion 813 engages with the inner-edge of the first opening 25, and the terminal holder 81 attaches to the motor case 20. In a similar manner, the inner-edge of the first opening 26 engages with the first fitting portion 813 to attach the terminal holder 81 to the motor case 20, by inserting the first fitting portion 813 into the first opening 26 first, and then sliding the terminal holder 81 in a direction towards the outer circumference of the bottom part 22.

Further, each of the terminal holders 81 has an extension portion 814 that extends from the inner-face 812 towards the opposite side of the first fitting portion 813 (i.e., extends from a lower end of the inner-face 812 and away from the outer-face 811). When the first fitting portion 813 is coupled with the inner-edge of the first opening 25 or the first opening 26, the extension portion 814 is positioned on the other side of the bottom part 22 of the motor case 20 relative to the cylinder part 21 (i.e. the extension portion 814 is positioned on the surface of the bottom part 22 that faces the lid 44 (FIG. 4)). Further, the terminal holder 81 stably stands (i.e. mounted) on the bottom part 22 with its extension portion 814 bound by the bottom part 22 and the lid 44 (FIG. 1).

Further, the terminal holder 81 defines an opening 815. The opening 815 allows communication or, in other words, provides an access hole between the outer-face 811 and the inner-face 812.

In the present embodiment, the terminal holder 81 holds the first terminal 301 formed in the shape of a long rectangular board with one face of the terminal 301 substantially set in parallel with the inner-face 812. By such arrangement, the first terminal 301 is prevented from being pulled out in a longitudinal direction of the terminal holder 81.

Further, one end of the first terminal 301 and the end 39 of the winding wire 34 are electrically coupled by, for example, welding. The opening 815 of the terminal holder 81 is formed as a work hole for welding one end of the first terminal 301 and the end 39 of the winding wire 34.

As described above, the terminal holder 81 holds the first terminal 301 in a manner that allows the engagement of the end of the first terminal 301 that is in a male shape with the end of the second terminal 701 that is in a female shape. As provided above, each of the terminal holders 81 holds three first terminals 301.

In the above-mentioned configuration, the controller case 40, which houses the controller 100, is separated from the bottom part 22 of the motor case 20 with the controller 100 still inside of the controller case 40, by removing the bolt 74 (FIG. 4). In other words, the controller case 40 is disposed on the motor case 20 in an attachable and detachable manner.

In summary, the motor case 20 and the controller case 40 are attachable with each other and are detachable from each other. Further, as for the electrical connection between the first terminal 301 on the motor 30 side and the second terminal 701 on the controller 100 side, such connection is established through the engagement of the first terminal 301 with the second terminal 701. Therefore, the first terminal 301 and the second terminal 701 are easily detachable and attachable when a predetermined force for separation or insertion (i.e., combination) is applied thereon. Thus, the controller case 100 can easily be separated from and attached to the motor case 20. As a result, when the controller 100 is broken, the controller 100 can easily be replaced without replacing the motor 30, or when the motor 30 is broken, the motor 30 can easily be replaced without replacing the controller 100.

In a course of separating the controller case 40 from the motor case 20, the engagement between the first terminal 301 and the second terminal 701 may pull the first terminal 301 in a separating direction of the controller case 20. However, in the present embodiment, the first terminal 301 is held in the terminal holder 81 that is attached to the motor case 20. Therefore, the first terminal 301 is prevented from being pulled toward the controller case 40 side, thereby preventing deterioration of the connection between the end 39 of the winding wire 34 of the motor 30 and the first terminal 301.

Further, in the present embodiment, when only the controller 100 is broken, the broken controller 100 can be replaced, with the motor 30 (i.e., the motor case 20) kept attached (i.e., un-removed) on the electric power steering apparatus 1 of the vehicle. Therefore, the vehicle can be repaired without being taken to the factory. That is, a service station, a vehicle dealer, or the like can fix such problem, thereby saving time for the user to bring the vehicle to the factory and to wait for the repair work.

Further, in the present embodiment, the electric coupling between the first terminal 301 on the motor 30 side and the second terminal 701 on the controller 100 side can be realized only by the engagement of those terminals 301, 701 with each other. Therefore, the motor 30 and the controller 100 may be separately assembled, and may be combined with each other in a final step of assembly onto the vehicle, for example. In such manner, efficiency of the production work of the drive unit 10 is improved.

Further, in the present embodiment, two terminal holders 81 respectively close the first opening 25 and the first opening 26 of the motor case 20. Therefore, foreign matter is prevented from falling into the motor case 20 through the first openings 25, 26, through which the end 39 of the winding wire 34 of the motor 20 is drawn toward an outside of the motor case 20.

Further, in the present embodiment, two terminal holders 81 respectively have the first fitting portion 813 to fit on the inner edge of the first opening 25 or on the inner edge of the first opening 26 of the motor case 20. In such manner, the terminal holder 81 is prevented from falling off in the axial direction of the motor case 20.

Second Embodiment

Figure 6:
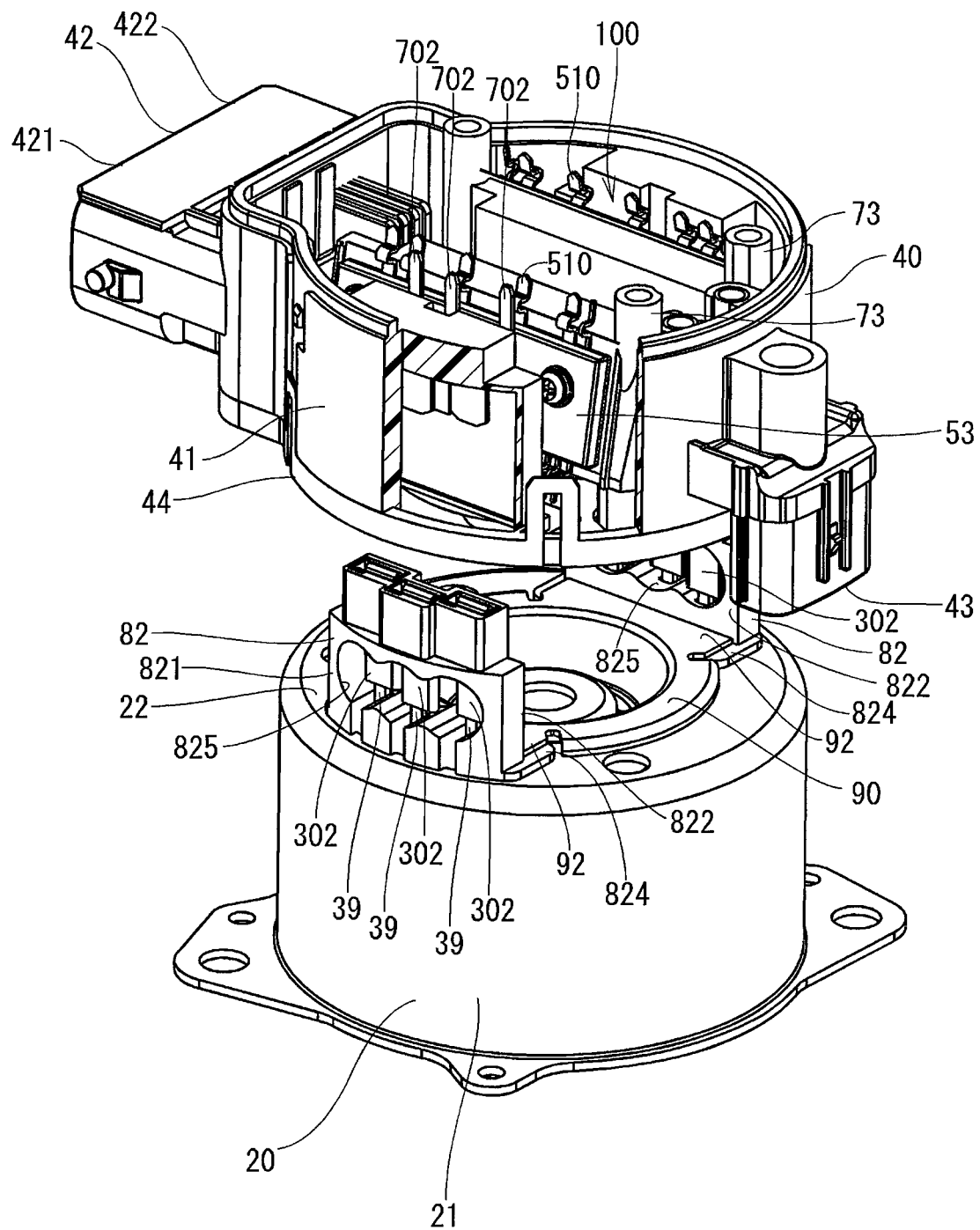
FIG. 6 is an exploded perspective view of a part of the drive unit in the second embodiment of the present disclosure.
Figure 7A:
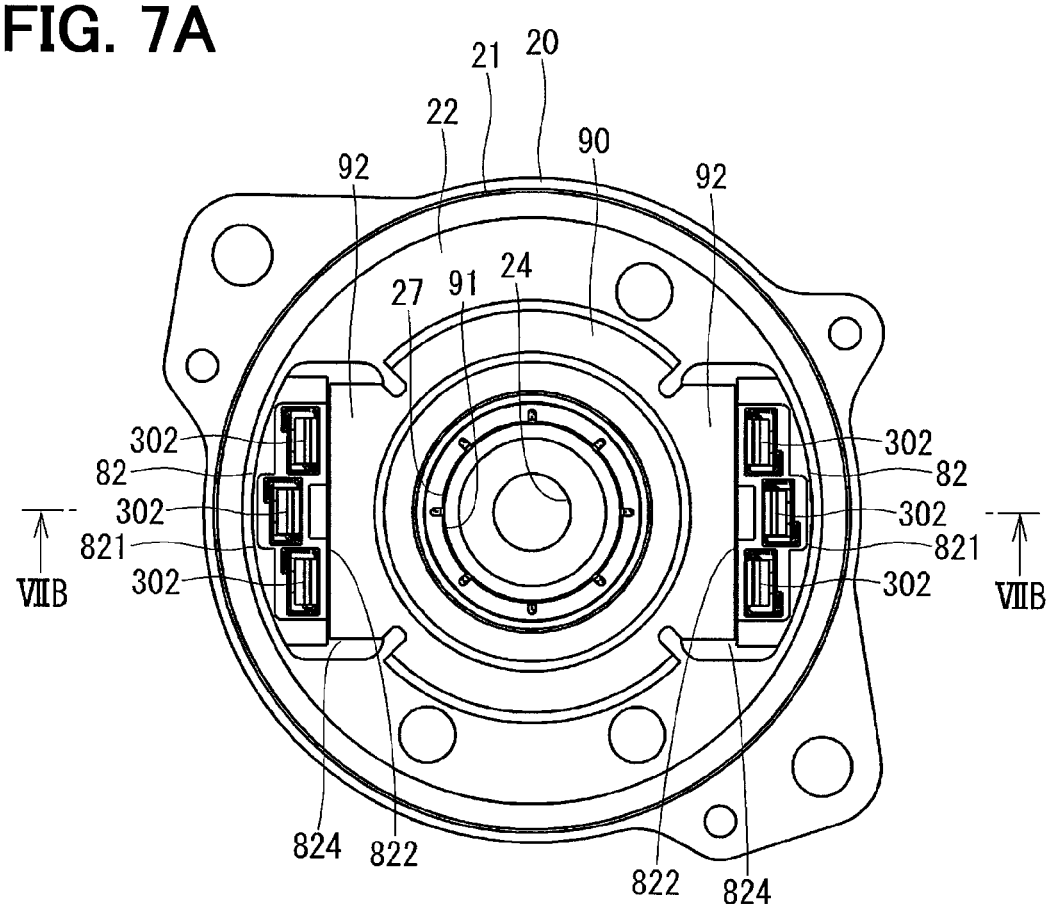
FIG. 7A is a top view of the motor case, the terminal holder and a latch member of the drive unit in the second embodiment of the present disclosure.

The drive unit 10 in the second embodiment of the present disclosure is shown in FIGS. 6 and 7A/7B. In the second embodiment, the shape of the terminal holder, as well as, the shape of the first and second terminals are different from the first embodiment.

With reference to FIG. 6, in the second embodiment, a terminal holder 82 is formed substantially in a rectangular shape. An outer-face 821 of the terminal holder 82 is formed as a curved surface and an inner-face 822 of the terminal holder 82 is formed as a plane surface. Two terminal holders 82 are attached on the motor case 20 with the outer face 821 facing towards a radial outside of the motor case 20 and the inner-face 822 facing towards a radial inside of the motor case 20. In other words, the outer-face 821 faces away from the shaft 33 and the inner-face 822 faces the shaft 33. Additionally, one terminal holder 82 is attached at the first opening 25 and one terminal holder 82 is attached at the first opening 26. Further, the terminal holders 82 respectively close the first opening 25 or the first opening 26.

Figure 7B:
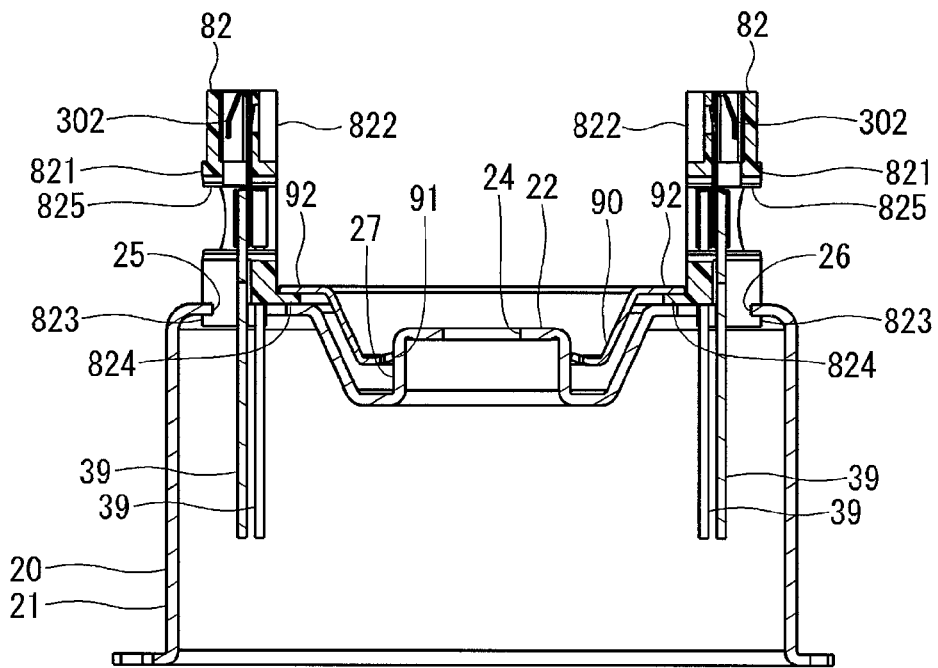
FIG. 7B is a cross-sectional view along line B-B line of FIG. 7A.

With reference to FIGS. 7A, 7B, where FIG. 7B is a cross-sectional view of motor case 20 along the B-B line of FIG. 7A, the terminal holder 82 has a first fitting portion 823 on a motor case 20 side end of the inner-face 821. The first fitting portion 823 couples to the inner edge of the first opening 25. Such structure enables the engagement of the first fitting portion 823 with the inner-edge of the first opening 25,26 for the attachment of the terminal holder 82 on the motor case 20, by inserting the first fitting portion 823 into the first opening 25 first, and then sliding the terminal holder 82 towards a radial outside of the motor case 20 (i.e. sliding the terminal holder 82 away from the center of the motor case 20 and towards the outer periphery of the motor case 20). In a similar manner, the first opening 26 is coupled with the terminal holder 82.

Further, each of the terminal holders 82 has an extension portion 824 that extends from the inner face 822 towards the opposite side of the first fitting portion 823 (i.e. the extension portion extends from the inner-face 822 in a direction away from the outer-face 821). When the first fitting portion 823 is engaged with the inner edge of the first opening 25 or the first opening 26, the extension portion 824 is positioned on the other side of the bottom part 22 of the motor case 20 relative to the cylinder part 21 (i.e. the extension portion 824 is positioned on the bottom part 22, specifically, the surface of the bottom part 22 that faces the controller 100.

Further, the terminal holder 82 defines an opening 825. The opening 825 allows communication or, in other words, provides an access hole between the outer face 821 and the inner face 822.

In the present embodiment, the terminal holder 82 holds a first terminal 302 formed in the shape of a long rectangular board with one face of the terminal 302 substantially set in parallel with the inner face 822. By such arrangement, the first terminal 302 is prevented from being pulled out in a longitudinal direction of the terminal holder 82.

Further, one end of the first terminal 302 and the end 39 of the winding wire 34 are electrically coupled by, for example, welding. More practically, one end of the first terminal 302 is folded to bind the end 39 and the first terminal 302 is welded to the end 39. The opening 825 of the terminal holder 82 is formed as a work hole for welding one end of the first terminal 302 and the end 39 of the winding wire 34. In the present, the other end of the first terminal 302 is formed in a female shape, and an end of the second terminal 702 of the controller 100 is formed in a male shape (FIG. 6). In such structure, the end of the first terminal 302 provided in the female shape is engagable with the end of the second terminal 702 provided in the male shape, and, such engagement of the terminals enables the electric coupling therebetween.

In the present embodiment, the drive unit 10 includes a latch member 90. The latch member 90 is substantially formed in the shape of a disc, and may be made of metal or the like. The latch member 90 has a press fit hole 91 at its center, and a latch 92 is formed at two positions on its outer edge. The latch member 90 is disposed on the bottom part 22 of the motor case 20, with the press fit hole 91 press-fitted on a radial outside of the shaft hole 24 (i.e. the press fit hole 91 is press-fitted around the pipe part 27 of the bottom part 22) (FIG. 7A/7B). In such state, each latch 92 of the latch member 90 binds the extension portion 824 of the terminal holder 82 with the bottom part 22 of the motor case 20 (FIG. 7B). That is, the terminal holder 82 is being latched or coupled by the match member 90. Thus, the terminal holder 82 is prevented from falling off of the motor case 20.

As described above, the terminal holder 82 has the extension portion 824 that extends in an opposite direction relative to the first fitting portion 823. Further, the latch member 90 is provided to hold or couple the extension portion 824 of the terminal holder 82 onto the bottom part 22 of the motor case 20 (i.e., the latch member 90 binds the extension portion 824 with the bottom part 22). In the present disclosure, the first fitting portion 823 of the terminal holder 82 is engaged with the inner edge of the first opening 25, 26, and the extension portion 824 on the other side of the terminal holder 82 is held or latched by the latch member 90. Therefore, the terminal holder is prevented from falling off the motor case 20.

Third Embodiment

The drive unit in the third embodiment of the present disclosure is described with reference to FIGS. 8 to 11. In the third embodiment, the shape of the terminal holder is different from the one in the second embodiment.

Figure 8:
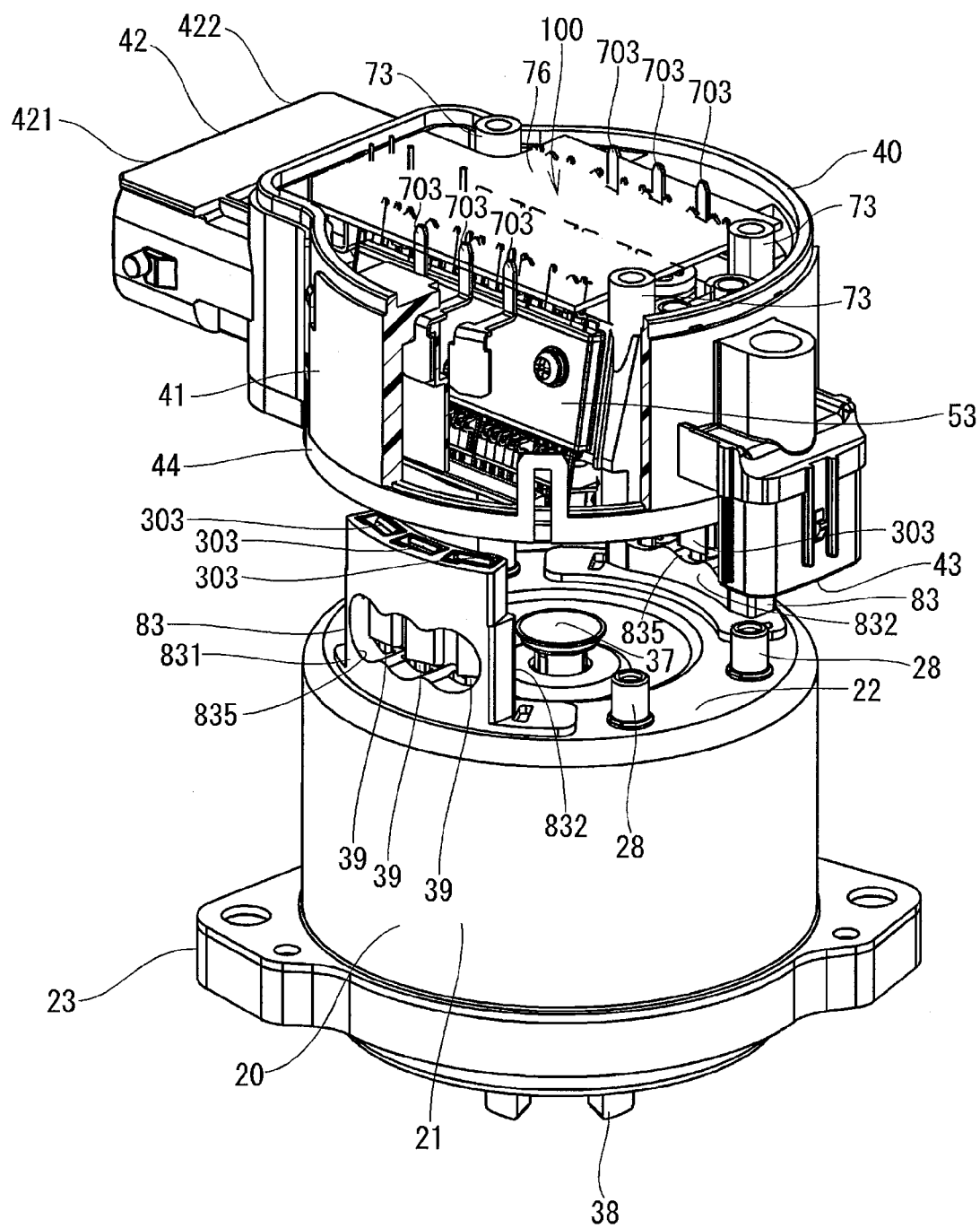
FIG. 8 is an exploded perspective view of a part of the drive unit in the third embodiment of the present disclosure.

With reference to FIG. 8, the terminal holder 83 of the third embodiment is formed substantially in a rectangular shape, and a first face 831 and a second face 832 are respectively formed in the shape of a curved plane. Two terminal holders 83 are arranged on the first opening 25, 26, respectively, such that the first face 831 faces in a radial outward direction of the motor case 20 and the second face 832 faces in a radial inward direction of the motor case 20. In other words, the first face 831 faces away from the shaft 33 and the second face 832 faces the shaft 33. Further, each of the terminal holders 83 closes those openings 25 and 26.

Figure 9A:
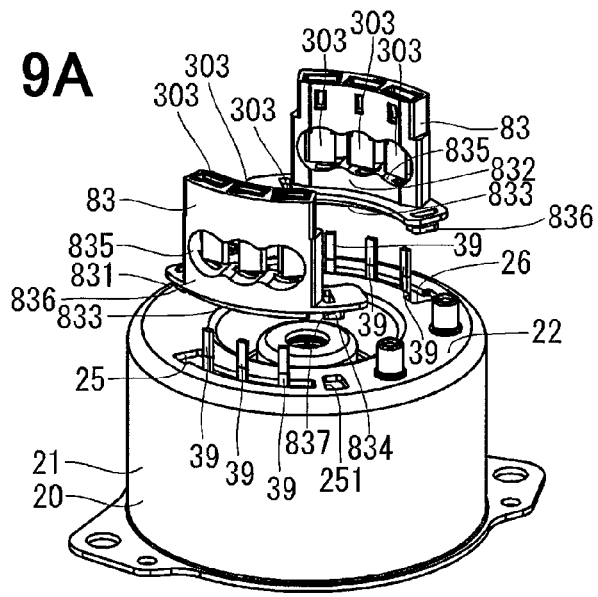
FIGS. 9A, 9B, 9C are illustrations of a before-assembly state of the terminal holder and the motor case of the drive unit in the third embodiment of the present disclosure.
Figure 9B:
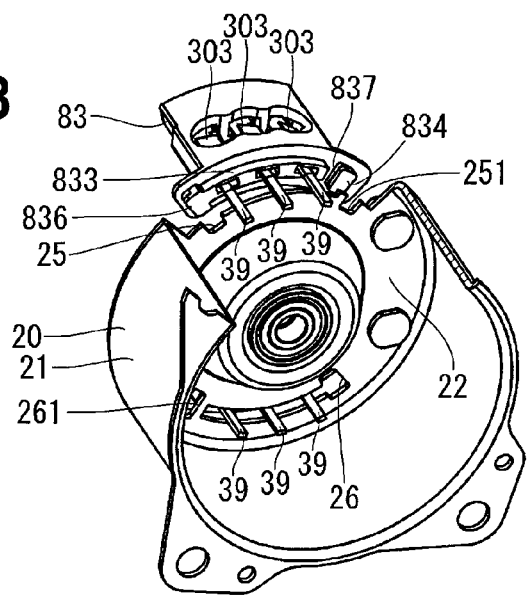
Figure 9C:
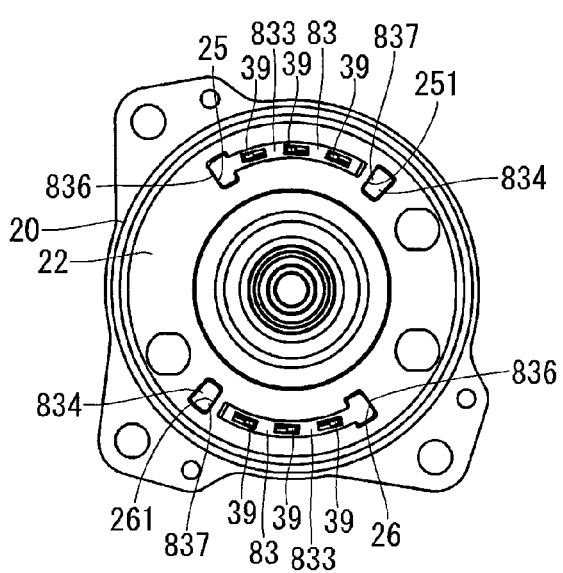

With reference to FIGS. 9A to 9C, in the present embodiment a second opening 251 and a second opening 261 are defined on the bottom part 22 in a board thickness direction at a predetermined distance from the first opening 25, 26, respectively. The second openings 251, 261 are positioned at a predetermined distance in an arc-extending direction from the first openings 25, 26, respectively. In other words, the second openings 251, 261 are a predetermined distance apart from the first openings 25, 26, respectively, in the circumferential direction.

The terminal holder 83 has an arc-shaped first projection 833 on a motor case 20 side end face (FIG. 9B). One side of the first projection 833 has a first fitting portion 836 that couples with the inner edge of the first openings 25, 26. Further, the terminal holder 83 has a second projection 834 at a predetermined distance in the arc-extending direction from an opposite end face that is opposite to the end face from which the first fitting portion 836 of the first projection 833 protrudes. On the first projection 833 side of the second projection 834, a second fitting portion 837 is formed, so that the second fitting portion 837 couples with the inner edge of the second opening 251 or the second opening 261.

Figure 10A:
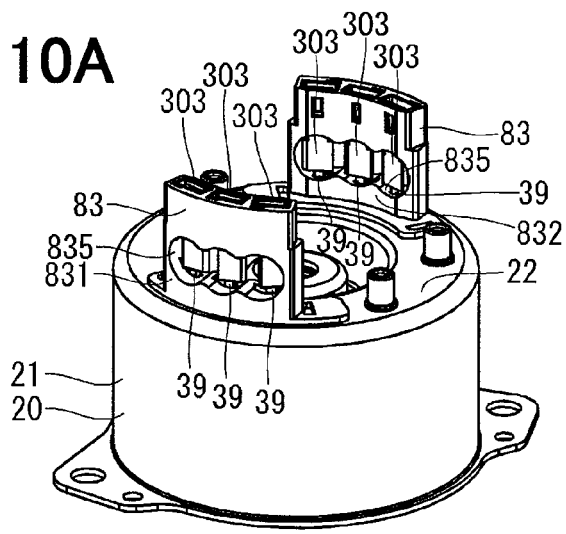
FIGS. 10A, 10B, 10C are illustrations of an after-assembly state of the terminal holder and the motor case of the drive unit in the third embodiment of the present disclosure.
Figure 10B:
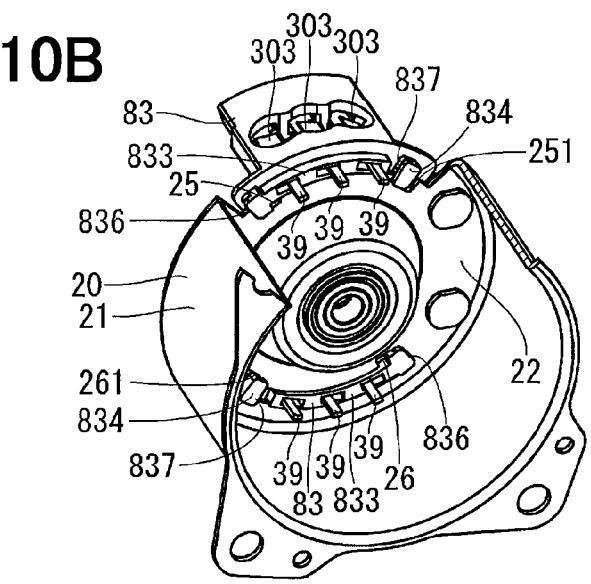
Figure 10C:
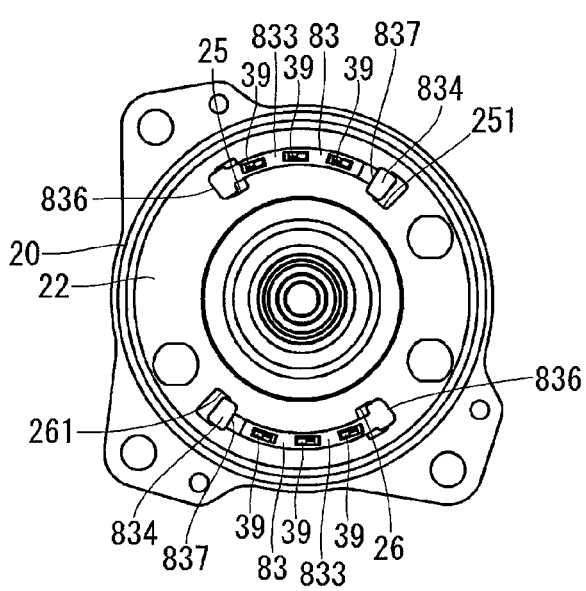

In the present embodiment, the two terminal holders 83 are first arranged to have the first projection 833 put into the first opening 25 or the first opening 26 and have the second projection 834 put into the second opening 251 or the second opening 261 (see FIGS. 9A to 9C), and then the two terminal holders 83 are rotatably moved in a circumferential direction relative to the motor case 20 to engage the first fitting portion 836 with the first opening 25 or the first opening 26 and to engage the second fitting portion 837 with the second opening 251 or the second opening 261 (see FIGS. 10A to 10C).

Further, the terminal holder 83 defines an opening 835. The opening 835 allows communication or, in other words, provides an access hole between the first face 831 and the second face 832.

In the present embodiment, the terminal holder 83 holds the first terminal 303 formed in the shape of a long rectangular board to have one surface of the terminal 303 substantially in parallel with the face 832. In such manner, the first terminal 303 is prevented from falling off from the terminal holder 83 in the longitudinal direction.

Figure 11A:
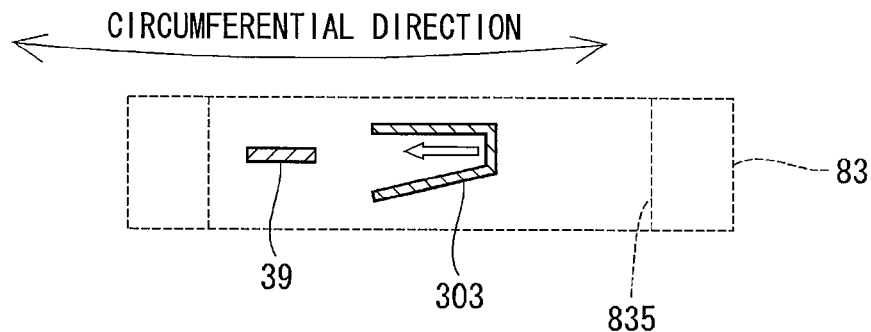
FIGS. 11A, 11B, 11C, 11D are illustrations of connecting and welding of one end of a first terminal and an end of a winding wire of the drive unit in the third embodiment of the present disclosure.

Further, one end of the first terminal 303 and the end 39 of the winding wire 34 are electrically coupled by, for example, welding. For example, with reference to FIGS. 11A to 11D, FIG. 11A provides a position of the first terminal 303 and a position of the end 39 of the winding wire 34 when the terminal holder 83 is arranged to have the first projection 833 positioned in the first opening 25 and to have the second projection 834 positioned in the second opening 251. For illustration purpose, only one of the three first terminals 303 in the terminal holder 83 is shown. As shown in FIG. 11A, the cross section of one end of the first terminal 303 is formed substantially in a U shape.

Figure 11B:
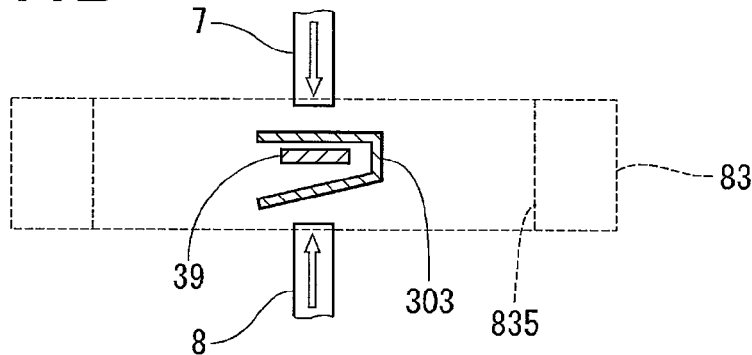
Figure 11C:
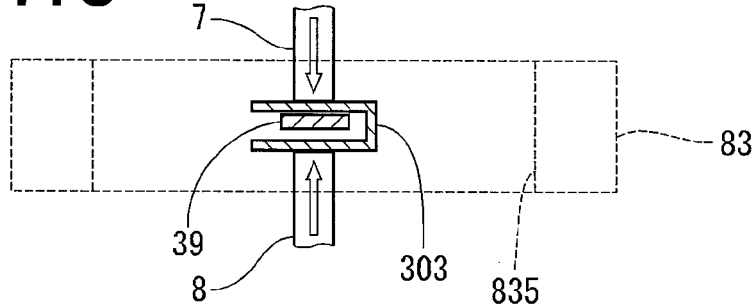
Figure 11D:
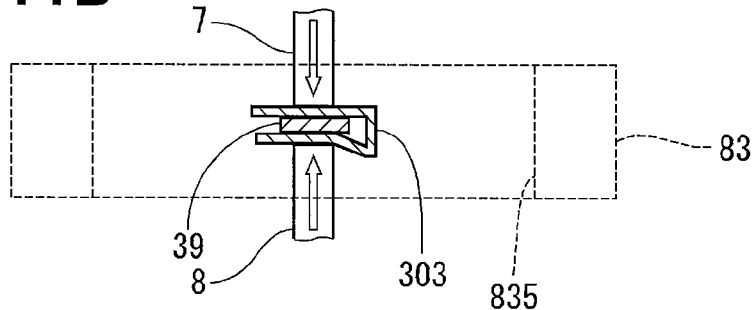

When the terminal holder 83 in such state is rotated relative to the motor case 20 in the circumferential direction, the first terminal 303 and the end 39 of the winding wire 34 come closer to each other, to have the first terminal 303 substantially surround the end 39 (FIG. 11B). A tool 7, 8 are inserted into the opening 835, and one end of the first terminal 303 is pressed together with the end 39 by a predetermined force, to couple one end of the first terminal 303 to the end 39 (FIGS. 11C and 11D). Further, as shown in FIG. 11D, one end of the first terminal 303 and the end 39 are welded by using the jig tools 7, 8. In such manner, one end of the first terminal 303 and the end 39 are electrically coupled with each other. In a similar manner, one end of the first terminal 303 on the first opening 26 side is coupled and welded to the end 39.

The opening 835 of the terminal holder 83 is, as described above, formed as a work hole for connecting and welding one end of the first terminal 303 and the end 39 of the winding wire 34. Further, the other end of the first terminal 303 is formed in a female shape in the present embodiment. Therefore, the other end of the second terminal 703 of the controller 100 is formed in a male shape (see FIG. 8). Thus, the other end of the second terminal 703 and the other end of the first terminal 303 are engagable, thereby enabling an electrical connection when engaged.

In summary, the second opening 251 and the second opening 261 that are different from the first opening 25 and the first opening 26 are formed on the bottom part 22 of the motor case 20 as described above in the present embodiment. The two terminal holders 83 respectively have the second fitting portion 837 to engage with the inner edge of the second opening 251 or the inner edge of the second opening 261. Therefore, in the present embodiment, the terminal holder 83 is arranged to engage the first fitting portion 836 with the inner edge of the first opening 25 or the inner edge of the first opening 26, and to engage the second fitting portion 837 with the inner edge of the second opening 251 or the inner edge of the second opening 261. Such structure can more effectively prevent the terminal holder 83 from falling off in the axial direction of the motor case 20.

Other Embodiments

Although the present invention has been fully described in connection with the preferred embodiment thereof with reference to the accompanying drawings, it is to be noted that various changes and modifications will become apparent to those skilled in the art.

The terminal holder in the above-described embodiment is attached on the motor case, holding the first terminal for the engagement between the other end of the first terminal and the other end of the second terminal. However, the terminal holder may be attached on the controller case, holding the second terminal for the engagement between the other end of the first terminal and the other end of the second terminal.

Further, the terminal holder may not necessarily close the first opening of the motor case completely, and the terminal holder may be installed at the other point different from the first opening of the motor case.

Further, the terminal holder is slid toward the radial outside of the motor case after putting the holder into the first opening in the above-described embodiments 1 and 2, for the engagement between the first fitting portion and the inner edge of the first opening. However, by changing the position of the first fitting portion, the terminal holder is slid toward a radial inside of the motor case after putting the holder into the first opening in the above-described embodiments 1 and 2, for the engagement between the first fitting portion and the inner edge of the first opening. Alternatively, after putting one end of the terminal holder into the first opening, the terminal holder may be moved/slid in the circumferential direction of the motor case, for the engagement between the first fitting portion and the inner edge of the first opening. In other words, the terminal holder of the present disclosure engages the first fitting portion with the inner edge of the first opening by sliding the holder along a virtual plane that is perpendicular to the axis of the motor case after being put into the first opening.

Further, in the third embodiment, the terminal holder is rotatingly moved relative to the motor case in the circumferential direction for the engagement between the first fitting portion and the inner edge of the first opening and for the engagement between the second fitting portion and the inner edge of the second opening, after inserting the first/second protrusions into the first/second openings. However, by changing the position of the first fitting portion and the second fitting portion on the terminal holder, the engagement between the first/second fitting portion and the first/second opening may be enabled by a twisting move of the terminal holder relative to the motor case, after inserting the first/second protrusions into the first/second openings.

Further, the terminal holder may have the first/second fitting portion and the extension portion, and the extension portion may be latched by the latch member. In other words, the configuration of other embodiments may be a combination of the configurations of the first embodiment and the second embodiment.

Further, the terminal holder may be attached on the motor case or on the controller case by other mechanism, without having the first/second fitting portion.

Further, the drive unit may be used in other devices or other apparatuses, such as a motor for driving a driving wheel of a hybrid vehicle or the like, which is different from the electric power steering apparatus. Furthermore, the drive unit may be used to drive a device in a mechanism other than the vehicle.

Such changes and modifications are to be understood as being within the scope of the present invention as defined by the appended claims.

What is claimed is:

1. A drive unit comprising:
   a motor having a stator with a winding wire wound thereon, a rotor disposed inside of the stator, a shaft disposed inside of and coupled to the rotor serving as a rotation axis of the rotor, and a first terminal electrically coupled to an end of the winding wire, wherein the rotor and the shaft rotate relative to the stator as one;

a motor case to house the motor, and having a cylinder part and a bottom part to close one axial end of the cylinder part, the bottom part defining a first opening;

a controller case substantially having a cylindrical shape and being attachable to the motor case on one end of the motor case with the axis of the controller case substantially aligned in parallel with an axis of the motor case;

a controller disposed inside of the controller case, and including a switching element for switching supply of electricity for the winding wire of the motor, a control unit for turning the switching element on and off to control a rotation of the motor, and a second terminal electrically coupling to the switching element on one end and electrically coupling to the first terminal at the other end; and a terminal holder coupled to the motor case through the first opening of the motor case, the terminal holder having a first fitting portion positioned on an end of the terminal holder and protruding from a portion of the terminal holder that extends through the first opening of the motor case, the first fitting portion slidingly engaging an inner surface of the bottom part of the motor case and coupling the terminal holder to the motor case wherein the terminal holder holds the first terminal, and the first terminal is coupled to the second terminal.

2. The drive unit of claim 1, wherein the terminal holder covers the first opening of the motor case.

3. The drive unit of claim 1, further comprising: a fastening member, wherein the terminal holder has an extension portion that extends in an opposite direction relative to the first fitting portion, and the fastening member holds the extension portion of the terminal holder onto the bottom part of the motor case.

4. The drive unit of claim 1, wherein
the bottom part of the motor case has a second opening that is different from the first opening, and
the terminal holder has a second fitting portion that slidingly engages the inner surface of the bottom part of the motor case.

5. The drive unit of claim 1, wherein the terminal holder engages the first fitting portion with an inner edge of the first opening by sliding the terminal holder away from a center of the motor case and towards an outer periphery of the motor case after being put into the first opening.

6. The drive unit of claim 1, wherein
the terminal holder and the first fitting portion have one body.

7. The drive unit of claim 4, wherein
the terminal holder, the first fitting portion, and the second fitting portion have one body.

* * * * *